March 3, 1936.　　　　L. M. THOMAS　　　　2,032,777
LAWN TOOL
Filed Oct. 29, 1934　　　3 Sheets-Sheet 1
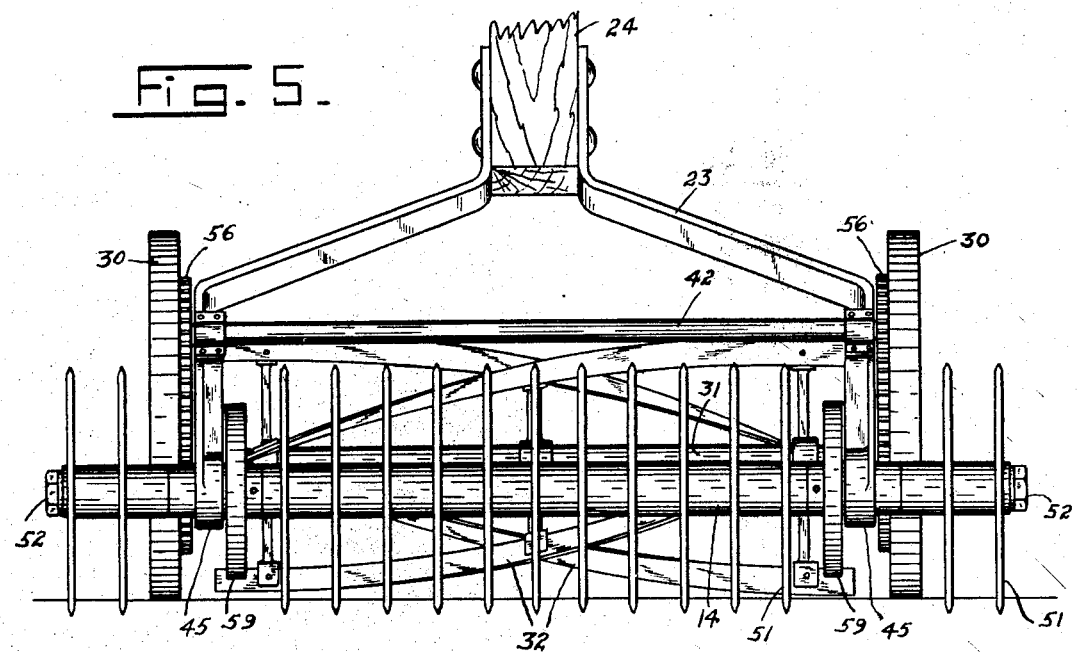
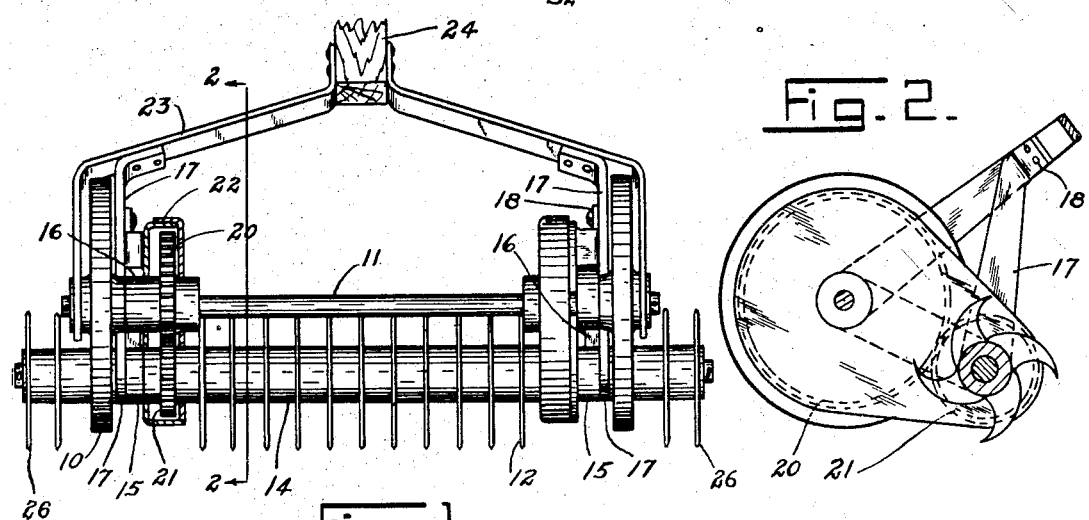
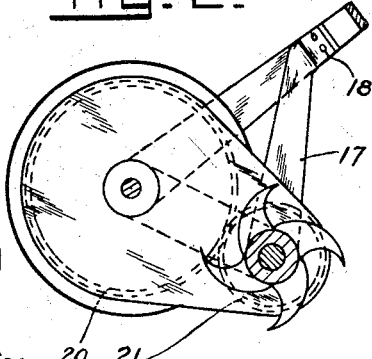
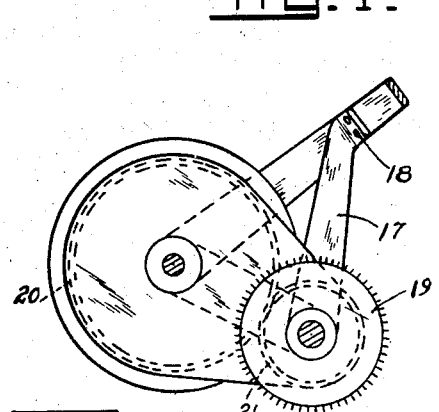
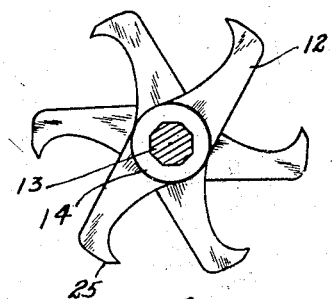
Inventor
Linley M. Thomas
By Bates, Goldrick & Teare
Attorneys March 3, 1936.  L. M. THOMAS  2,032,777
LAWN TOOL
Filed Oct. 29, 1934  3 Sheets-Sheet 2
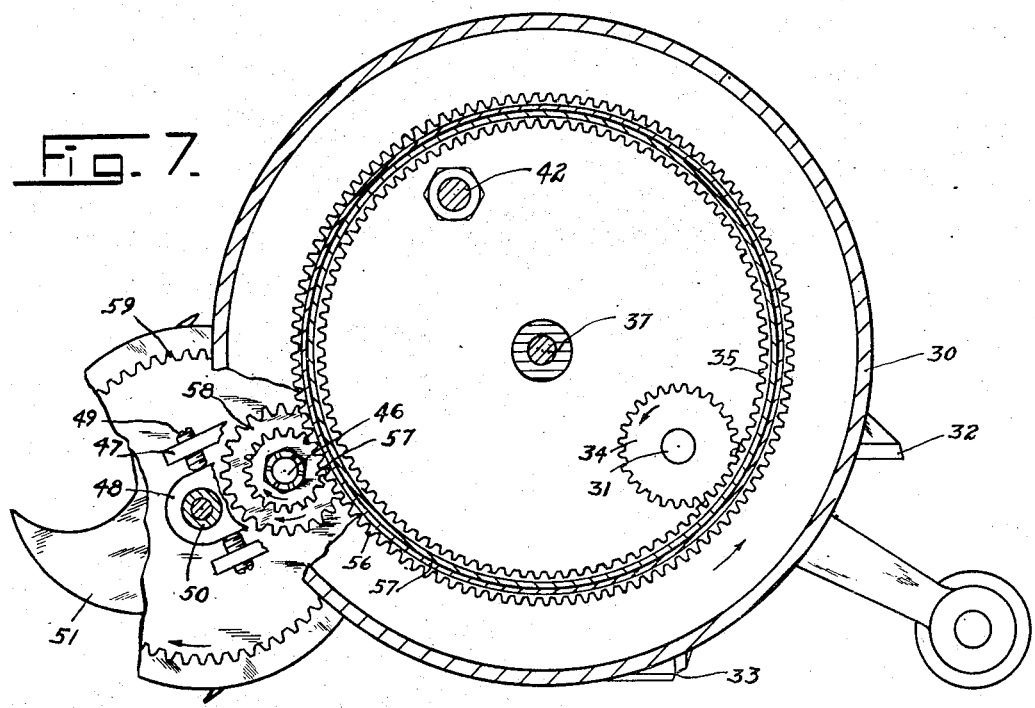
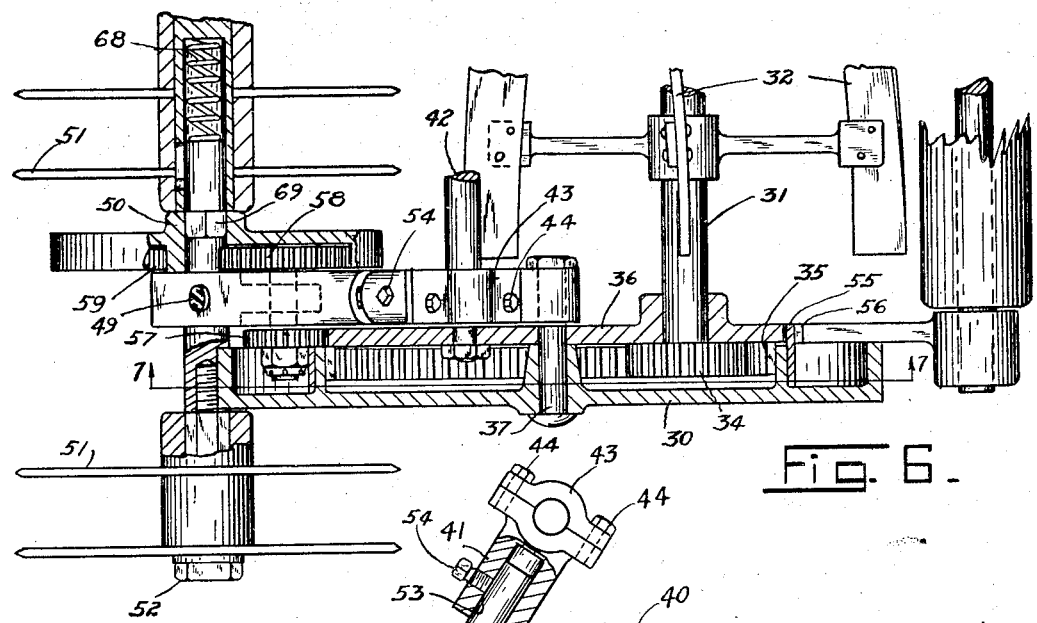
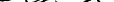

March 3, 1936.                L. M. THOMAS                2,032,777
                                LAWN TOOL
                         Filed Oct. 29, 1934           3 Sheets-Sheet 3
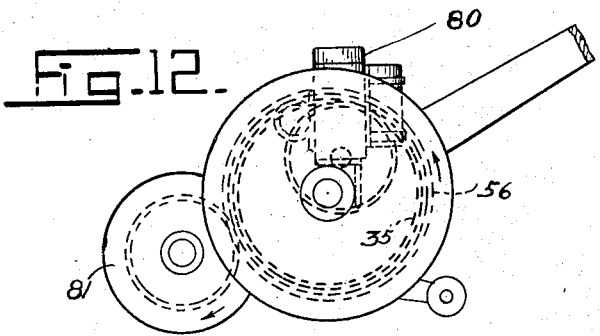
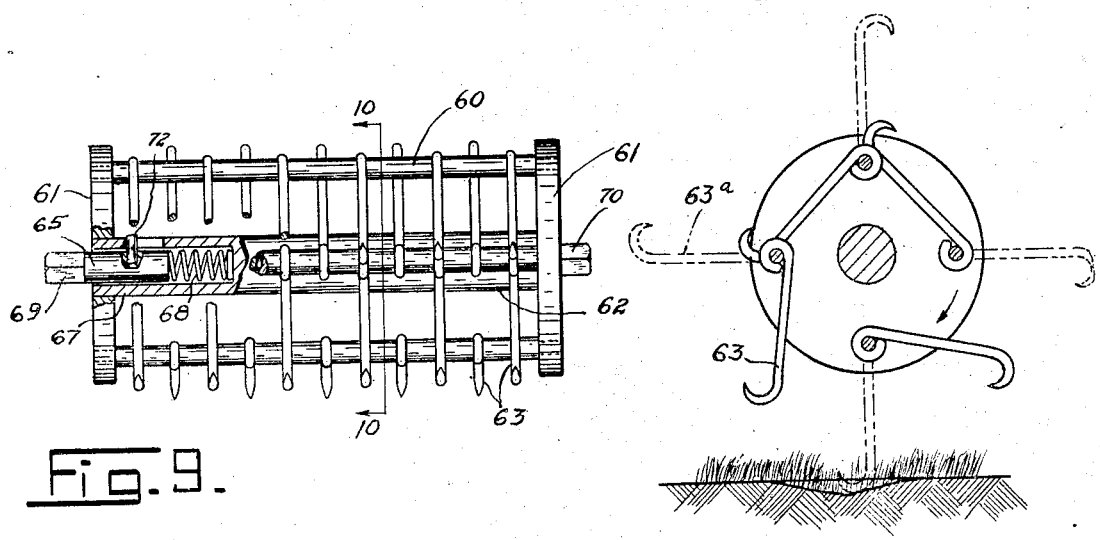
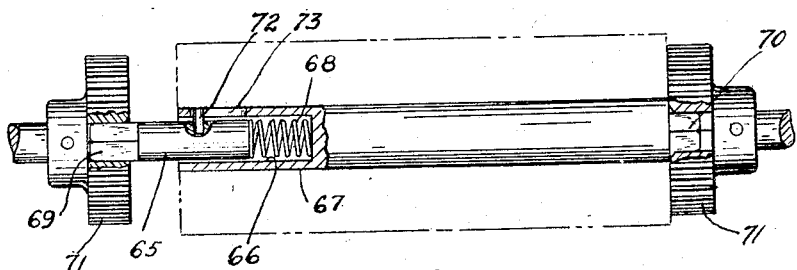
Inventor
Linley M. Thomas
By Bates, Golrick & Tease
                    Attorney Patented Mar. 3, 1936

2,032,777

UNITED STATES PATENT OFFICE 2,032,777

LAWN TOOL

Linley M. Thomas, Cleveland, Ohio

Application October 29, 1934, Serial No. 750,474

4 Claims. (Cl. 97—40)

This invention relates to lawn tools and has for one of its objects the provision of a tool which, when moved across a lawn, lifts the leaves and, in many cases, the roots of weeds, crab grass, chickweed and the like, so that they may be cut off easily by the mower.

Heretofore, the only practical solution, so far as I am aware, of removing weeds or other objectionable growth from lawns has been to dig them out by hand, but such operation is tedious and laborious. Crab grass, chickweed and other vinous plants that are found in lawns form a matted growth that cannot be removed with a lawn mower, but are easily removed if a fork-like tool is inserted beneath it and moved with a forward and upward motion. When the lateral shoots of wild grass are raised, the roots are usually pulled out with them and the plants are thereby destroyed. Where the roots, however, are firmly embedded, the lifting of the shoots enables them to be cut off closely at their crowns with a mower, with the result that the plants will quickly die.

An object of my invention, therefore, is to make a tool which, if desired, may be attached to a mower for accomplishing the purpose aforesaid or, if desired, may be made as a separate tool which operates independently of the mower.

My invention also includes a construction which is well adapted for use either with a hand mower or a power mower, and which is provided with an adjustment for controlling the depth to which the teeth penetrate the ground.

Referring now to the drawings, Fig. 1 is a front elevation of a tool, which embodies one form of my invention; Fig. 2 is a section taken on the line 2—2 in Fig. 1; Fig. 3 is a section through the weed lifting tool on a scale larger than that shown in Fig. 2; Fig. 4 is a side elevation of the tool with a modified form of weed lifter; Fig. 5 is a front view of a lawn mower having a device embodying my invention attached thereto; Fig. 6 is a top plan view, partly in section, and showing, on a larger scale, the mechanism which is illustrated with the mower of Fig. 5; Fig. 7 is a section taken on the line 7—7 in Fig. 6; Fig. 8 is a side elevation of a bracket, which may be used for supporting the attachment on a mower; Fig. 9 is a front elevation of a modified form of weed lifting tool; Fig. 10 is a section taken on the line 10—10 in Fig. 9; Fig. 11 is a front elevation, partly in section, of a weed lifting tool and illustrates the manner of connecting it to the driving member, and Fig. 12 is a side elevation of a power mower that is equipped with my invention.

The tool, which I have devised, may be operated in the same manner as a lawn mower, and is illustrated in Fig. 1 in connection with a hand-mower which has ground wheels 10 that are rigidly attached to a drive shaft 11. The weed lifter preferably comprises a plurality of blades 12 which are fixed to a shaft 13 and are spaced apart by sleeves 14. The shaft 13 may be journalled in brackets 15 which extend downwardly from the drive shaft 11, and in brackets 17 which extend downwardly from the arms 23 on the handle 24. The blade shaft may be driven by gears 20 that are fixed to the drive shaft. A casing 22 encloses the gears, and is adapted to be fixed to the brackets 17 by securing members 18.

The blades which I have illustrated, are relatively thin strips of metal the ends of which are shaped to provide hook-like teeth 25 that accomplish a forward and upward lifting motion as the tool is moved across a lawn. The brackets 16 and 17 operate to hold the shaft 13 in a definite position with reference to the handle, and yet allow it to be oscillated about the axis of the shaft 11. Thus, whenever the handle is raised or lowered, the teeth of the blades 12 are raised or lowered proportionately, with the result that the blades can be made to penetrate the ground and thus to loosen weeds.

I have found that the cutters described and illustrated operate satisfactorily to pull a large proportion of the objectionable grass and weeds out of the lawn without disturbing the grass and that, if the weeds are not too firmly embedded, at least the weeds are raised to a point where they can be readily severed by the mower. The blades, being relatively thin, do not interfere with the desirable grass, and so the tool may be used on a lawn without danger of harming it to any degree. I have also found that the tool can be moved at about the same speed as the lawn mower, and that it produces astonishing results in freeing a lawn of weeds. In fact, after a few treatments and removal of the weeds, the grass has an opportunity to grow, and quickly fills out the hollow spots, thus making a smooth and uniform lawn.

In Fig. 4, I have shown a modification of the rotary weed lifting member, which may under some conditions be used in place of the blades 12. The modification comprises a cylindrical wire brush 19, the bristles of which are relatively stiff and extend radially from the shaft. This form will not penetrate the ground as readily as that illustrated in Fig. 1, but it will operate satisfactorily to accomplish the desired result.

Where the lifter is disposed between the ground wheels of the mower it is obvious that the space adjacent a wall or building cannot be satisfactorily treated. Accordingly, in Fig. 1, I have shown a few blades 26 that are mounted on an extension of the blade shaft, and that are disposed outside the confines of the ground wheels. Thus the blades can be propelled in close proximity to a wall whenever desired.

In Figs. 5 to 8 I have shown a modification of my invention, wherein the weed lifter is made in the form of an attachment for use on existing lawn mowers. In the mower illustrated the ground wheels are indicated at 30, the mower shaft at 31, the rotating blades at 32, and the stationary blade at 33. In this illustration, the rotary blade together with the drive shaft is operated by a pinion 34 which meshes with an internal gear 35 on the ground wheels. The gears 34 and 35 are protected by a stationary casing 36 which supports the center pins 37 on which the ground wheels are journalled. The plates 36 may also support the weed lifting attachment and to this end I have shown a bracket (Fig. 8) one arm of which indicated at 40 has its outer end supported on the center pin 37, and the other arm of which, indicated at 41, has the outer end supported on the cross-bar 42. The arm 41 terminates in a cap 43 which may be bolted to it by fastening members 44, and which operate to permit the tool to be attached and removed, as desired.

The lower part of each bracket has a hub 45 in which a shaft 46 is journalled and may have arms 47 between which a block 48 is held by set screws 49. The block acts as a bearing for the blade shaft 50, and has a tongue 9 which is pivoted on the shaft 46.

In Fig. 6, I have illustrated only one end of the mower, but it is to be understood that the same construction is to be duplicated on the opposite end. The shaft 50 carries the blades 51 which are disposed in spaced relationship between the ground wheels. To lift the leaves and grass close to a building or to a wall I have shown the shaft 50 as being extended beyond the ground wheels and as having additional blades mounted thereon. This latter feature, however, is optional, as it is not a necessary part of the apparatus. It may be removably attached to the shaft by a threaded securing member 52.

To drive the shaft 50 from the ground wheels, I have shown each wheel as having an annular internal flange 55 that supports an external gear 56. Such gear meshes with a pinion 57 that is fixed to the shaft 46 and that is disposed on the outer side of the bracket. Another pinion 58 is rigidly fastened to the shaft 46 on the inner side of the bracket, and is arranged to mesh with an internal gear 59 that is fixed to the shaft 50. The gearing arrangement is such that the teeth of the blades move forwardly and upwardly as the mower is moved across a lawn.

The arrangement illustrated in Figs. 1 and 2 enables an operator to control the depth of ground penetration by the angle at which the handle is held during the mowing operation. In Fig. 6 however, the movement of the handle can have no effect upon the extent to which the lifter penetrates the soil. Accordingly I have shown an adjustment by means of which the penetration can be regulated and then locked in position. One form of such mechanism embodies a telescopic connection 53 on the arm 41, as is illustrated in Fig. 8. A set screw 54 may then be used to lock the telescopic parts in any desired position. The telescopic connection permits a quick adjustment for depth, while the set screws 49 permit a finer adjustment.

In Figs. 9 and 10, I have shown another modification of a weed lifting tool. In such modification the body of the tool has bars 60 that are supported at their ends by plates 61 which, in turn, are rigidly connected to a central member 62. Mounted on the bars, and at regular intervals, are hooks 63 which are free to swing about the bars. Thus, when they are in use, centrifugal force makes them swing outwardly as shown in 63ᵃ in Fig. 10 in which position, they are well adapted to enter depressions in the ground, and to lift any weeds that may be growing therein. I have found that the hooks are well suited for the intended purpose, and that they are self-cleaning at all times.

To facilitate the interchangeability of the various forms of weed lifting tools, I have shown quick detachable connections in Figs. 9 and 11, by means of which any one of the tools illustrated in Figs. 1, 4 and 10 may be interchanged. Such connection may comprise a plunger 65, which projects from a cylinder 66 in one end of the central support or shaft 67. The spring 68 normally urges the plunger outwardly, so as to bring the non-circular end 69 thereof into driving engagement with the correspondingly shaped opening in the driving gear, such as that illustrated at 71. The opposite end 70 of the shaft and the coacting gear 71 may be similarly formed, as indicated.

The movement of the plunger with reference to its cylinder may be limited by a pin 72, which is attached to it, and which moves in a slot 73 in the central member 62. Thus to insert a tool it is only necessary to press the plunger inwardly and to insert the end 70 in its coacting socket and thereafter to release the plunger when the end 69 is in alignment with its associated socket.

I have found that a tool made in accordance with my invention produces surprising results, especially in that it can be manipulated by the operator to penetrate the soil to the required degree for lifting weeds, and that the operation can be accomplished at substantially the same speed as that at which a lawn mower is normally used. A lawn so treated deprives the weeds and other objectionable plants of means for gathering food, and thereby starves them without in any way affecting the growth of the desired grass. For large lawns it is preferable to utilize a tool which operates independently of the mower; but for small lawns the attachment will be sufficient to accomplish the desired results in a satisfactory manner.

The weed lifting tool is shown in connection with a hand mower, wherein the rotating tool is driven by the ground wheels. The invention however is well adapted for use on a power mower in which the source of power, that operates independently of the ground wheels, may be utilized for rotating the lifter. A power actuated mower is illustrated, for example, in Fig. 12, wherein the source of supply is indicated, in general, at 80, while the weed lifting tool is indicated, in general, at 81. Suitable gearing then connects the source of power to the weed lifting apparatus. Such power-driven device may, if desired, be used without the mower blade.

I claim:—

1. A tool of the character described, comprising in combination, a lawn mower having ground wheels and a handle, non-rotatable casings associated with the ground wheels, a bar extending between the wheels and carried by the casing, weed lifting hooks adapted to penetrate the turf, supported by the bar and forwardly of the mower, and means for rotating the tool as the mower is propelled in a forward direction.

2. In combination, a lawn mower having ground wheels, internal gears thereon, a non-rotatable member associated with the mower, a bracket attached to the member, and having two shafts journalled therein, one of the shafts having a plurality of ground engaging blades affixed thereto and having a gear associated therewith and the other shaft having two gears fixed thereto, one of the gears meshing with the gear on the ground wheel and the other meshing with a gear on the blade shaft.

3. A lawn tool comprising a member having a pair of ground engaging traction wheels, a weed lifter affixed thereto and having a hooked free end adapted to penetrate the turf, and means for rotating the lifter in a direction opposite to that of the traction wheels while the member is being propelled across a lawn.

4. A lawn tool comprising in combination, a member having a pair of traction wheels, a weed lifter carried by the member, means for rotating the lifter in a direction opposite to that of the traction wheels while it is being moved across a lawn, said lifter comprising a shaft, having a plurality of relatively thin members carried thereby, and extending in a radial direction, each member having a forwardly hooked free end.

LINLEY M. THOMAS.